United States Patent
Hwang et al.

(10) Patent No.: US 11,299,578 B2
(45) Date of Patent: Apr. 12, 2022

(54) SELF-RESTORING POLYURETHANE-BASED POLYMER AND PREPARATION METHOD THEREFOR

(71) Applicant: KOREA RESEARCH INSTITUTE OF CHEMICAL TECHNOLOGY, Daejeon (KR)

(72) Inventors: Sung Yeon Hwang, Seoul (KR); Jeyoung Park, Ulsan (KR); Dong Yeop Oh, Busan (KR); Jong Geon Jegal, Ulsan (KR); Seon Mi Kim, Busan (KR); Hyeon Yeol Jeon, Busan (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 198 days.

(21) Appl. No.: 16/618,582

(22) PCT Filed: Jul. 11, 2018

(86) PCT No.: PCT/KR2018/007866
§ 371 (c)(1),
(2) Date: Dec. 2, 2019

(87) PCT Pub. No.: WO2019/013551
PCT Pub. Date: Jan. 17, 2019

(65) Prior Publication Data
US 2020/0157271 A1    May 21, 2020

(30) Foreign Application Priority Data
Jul. 12, 2017  (KR) .................. 10-2017-0088470

(51) Int. Cl.
*C08G 18/38* (2006.01)
*C08G 18/24* (2006.01)
(Continued)

(52) U.S. Cl.
CPC ....... *C08G 18/3868* (2013.01); *C08G 18/246* (2013.01); *C08G 18/4825* (2013.01);
(Continued)

(58) Field of Classification Search
CPC ............ C08G 18/3868; C08G 18/4825; C08G 18/6666; C08G 18/722
See application file for complete search history.

(56) References Cited

U.S. PATENT DOCUMENTS 3,905,944 A    9/1975 Finelli
2018/0355092 A1*  12/2018 Smits ................. C08G 18/4288

FOREIGN PATENT DOCUMENTS

CN    106833129 A      6/2017
CN    107082862 A   *  8/2017
(Continued)

OTHER PUBLICATIONS

CN-107082862-A_08-2017_English Translation.*
(Continued)

*Primary Examiner* — Michael L Leonard
(74) *Attorney, Agent, or Firm* — Knobbe Martens Olson & Bear LLP (57) ABSTRACT

A self-restoring polyurethane-based polymer obtained by polymerization of a composition containing an aromatic disulfide diol represented by Chemical Formula, HO—$Ar_1$—S—S—$Ar_2$—OH, an alicyclic polyisocyanate, and a polyol. $Ar_1$ and $Ar_2$ each are independently a substituted or unsubstituted $C_6$-$C_{30}$ arylene group. The composition satisfies Equation, $0.1 \leq M_{[disulfide]}/M_{[OH]}$. $M_{[disulfide]}$ is a total mole number of the aromatic disulfide diol in the composition, and $M_{[OH]}$ is a total mole number of the aromatic disulfide diol and the polyol in the composition.

10 Claims, 2 Drawing Sheets

(51) Int. Cl.
  *C08G 18/48* (2006.01)
  *C08G 18/66* (2006.01)
  *C08G 18/72* (2006.01)
  *C08G 18/73* (2006.01)
  *C08G 18/75* (2006.01)
  *C08J 5/18* (2006.01)

(52) U.S. Cl.
  CPC ....... *C08G 18/6666* (2013.01); *C08G 18/722* (2013.01); *C08G 18/73* (2013.01); *C08G 18/755* (2013.01); *C08J 5/18* (2013.01); *C08J 2375/04* (2013.01)

(56) References Cited

FOREIGN PATENT DOCUMENTS

| | | |
|---|---|---|
| JP | 2003-231729 A | 8/2003 |
| KR | 10-1992-001245 B1 | 2/1992 |
| KR | 10-2015-0097902 A | 8/2015 |
| KR | 10-1830749 B1 | 2/2018 |

OTHER PUBLICATIONS

Insertion Metathesis Depolymerization of Aromatic Disulfide-containing Dynamic Covalent Polymers under Weak Intensity Photoirradiation_08-2013_Ohishi et al. Chem. Lett. 2013, 42, 1346-1348.*
International Search Report of corresponding PCT Application PCT/KR2018/007866—4 pages (dated Oct. 16, 2018).
Rekondo et al., "Catalyst-free room-temperature self-healing elastomers based on aromatic disulfide metathesis", Materials Horizons, vol. 1—5 pages (2014).
Xu et al., "A Novel Self-Healing Polyurethane Based on Disulfide Bonds", Macromolecular Chemistry and Physics, vol. 217—7 pages (2016).
Office Action of Japanese Patent Application No. 2020-504086—9 pages (dated Nov. 17, 2020).
Kim et al., "Superior Toughness and Fast Self-Healing at Room Temperature Engineered by Transparent Elastomers", Advanced Materials, vol. 30, No. 13—9 pages (2018).

* cited by examiner

SELF-RESTORING POLYURETHANE-BASED POLYMER AND PREPARATION METHOD THEREFOR

TECHNICAL FIELD

The present invention relates to a self-restoring polyurethane-based polymer and a preparation method therefor, and more particularly, to a self-restoring polyurethane-based polymer having a high toughness and capable of self-restoring at room temperature without additional heat treatment or light-irradiation, upon the damage of the self-restoring polyurethane-based polymer, and a preparation method therefor.

BACKGROUND ART

Coating compositions and coating film materials for paint protection having anti-scratch, anti-chip, or anti-stone function are widely applied to the vehicle, the military, and the IT.

In the case of the vehicle, the coating compositions and the coating film materials enable to prevent a surface of a vehicle body or headlights from being damaged by debris or sand during driving of the vehicle, and are also necessary for aesthetic purposes. In the case of the military, since even small scratches of helicopter wing surfaces may be fatal, the anti-chip coating films are absolutely essential. In the case of the IT, the coating compositions and the coating film materials are necessary for protecting the display of a smart phone or a TV from external damage, and for preventing wing damage caused by ice on the surface of the drones.

The main properties required in this anti-chip coating technology are transparency, abrasion resistance, solvent resistance, and the like. In the 2000s, anti-chip coating films to which a function related to self-healing (self-restoring) is added, began to be developed. The term self-restoring function refers to a characteristic that when the coating surface is scratched, it is restored by itself and returns to an original clean state thereof with no scratches.

The self-restoring function may be classified as an extrinsic-type or an intrinsic-type according to its operation mechanism. A mechanism that the coating film is restored by a healing agent released while a microcapsule contained in the coating film bursts due to a scratch is referred to as the extrinsic-type. The mechanism has interfacial heterogeneity at the restoring site, and has a fundamental difficulty in the re-restoration due to exhaustion of the microcapsule. The intrinsic-type proposed in order to overcome this problem introduces functional groups capable of reversibly covalent bonding to the chemical bond of the coating material itself by heat or light to have advantages in the interfacial heterogeneity and the re-restoration, such that various materials are attempted as the intrinsic-type.

However, as the self-restorable materials of the intrinsic-type, coating films capable of restoring scratches only when external stimuli such as heat treatment or light treatment are applied are mostly used. Thus, it has been pointed out as being inconvenient that the artificial external stimuli should be applied for self-restoration.

Due to these problems, it is required to develop a self-restoring polyurethane-based coating film having a high toughness, which may be self-restored at room temperature without additional heat treatment or light-irradiation, upon the damage of the self-restoring polyurethane-based coating film.

Korean Patent Laid-Open Publication No. 10-2015-0097902 is presented as a similar prior art document.

DISCLOSURE

Technical Problem

An object of the present invention is to provide a self-restoring polyurethane-based polymer capable of self-restoring at room temperature without additional heat treatment or light-irradiation, upon the damage of the self-restoring polyurethane-based polymer, and having a high toughness, and a preparation method therefore.

Technical Solution

In one general aspect, there is provided a self-restoring polyurethane-based polymer obtained by polymerization of a composition containing an aromatic disulfide diol represented by Chemical Formula 1 below, an alicyclic polyisocyanate, and a polyol.

$$HO-Ar_1-S-S-Ar_2-OH \quad \text{[Chemical Formula 1]}$$

wherein $Ar_1$ and $Ar_2$ each are independently a substituted or unsubstituted arylene group having 6 to 30 carbon atoms.

In this case, the composition may satisfy Equation 1 below.

$$0.1 \leq M_{[disulfide]}/M_{[OH]} \quad \text{[Equation 1]}$$

wherein $M_{[disulfide]}$ is a total mole number of the aromatic disulfide diol in the composition, and $M_{[OH]}$ is a total mole number of the aromatic disulfide diol and the polyol in the composition.

The alicyclic polyisocyanate may be any one or two or more selected from the group consisting of isophoronediisocyanate(IPDI), 4,4'-dicyclohexylmethane diisocyanate (hydrogenated MDI), cyclohexylenediisocyanate, methylcyclohexylenediisocyanate(hydrogenated TDI), bis(2-isocyanatoethyl)-4-dicyclohexene-1,2-dicarboxylate and 2,5-norbornane diisocyanate and 2,6-norbornanediisocyanate.

The self-restoring polyurethane-based polymer may have, at a temperature of 25° C., a self-restoring rate of 50% or more and may satisfy a toughness restoring rate of Equation 2 below.

$$50 \leq T_1/T_0 \times 100 \quad \text{[Equation 2]}$$

wherein, $T_0$ is a toughness (MJ/m$^3$) of the self-restoring polyurethane-based polymer before cutting, and $T_1$ is a toughness (MJ/m$^3$) of the self-restoring polyurethane-based polymer obtained after cutting and re-conjugating at a temperature of 25° C. for 2 hours.

The composition may further include any one or two or more selected from aliphatic polyisocyanates and aromatic polyisocyanates. In this case, the composition may satisfy Equation 3 below.

$$0.15 \leq M_{[cycloaliphatic]}/M_{[NCO]} \leq 1 \quad \text{[Equation 3]}$$

wherein $M_{[cycloaliphatic]}$ is a total mole number of the alicyclic polyisocyanate in the composition, and $M_{[NCO]}$ is a total mole number of the polyisocyanate-based compound in the composition.

In another general aspect, there is provided a preparation method for a self-restoring polyurethane-based polymer, comprising polymerizing a composition containing an aromatic disulfide diol represented by Chemical Formula 1 below, an alicyclic polyisocyanate, and a polyol.

[Chemical Formula 1]

wherein $Ar_1$ and $Ar_2$ each are independently a substituted or unsubstituted arylene group having 6 to 30 carbon atoms.

In still another general aspect, there is provided a self-restoring polyurethane-based coating film comprising the self-restoring polyurethane-based polymer as described above.

Advantageous Effects

The self-restoring polyurethane-based polymer according to the present invention may be self-restored at room temperature without additional heat treatment or light-irradiation by using an aromatic disulfide diol and an alicyclic polyisocyanate as a monomer component. As a specific example, the self-restoring polyurethane-based polymer according to one embodiment of the present invention may have a self-restoring rate of 50% or more at a temperature of 25° C.

In addition, the self-restoring polyurethane-based polymer according to one embodiment of the present invention may maintain a high toughness even when re-conjugated after being cut.

BEST MODE

Figure 1:
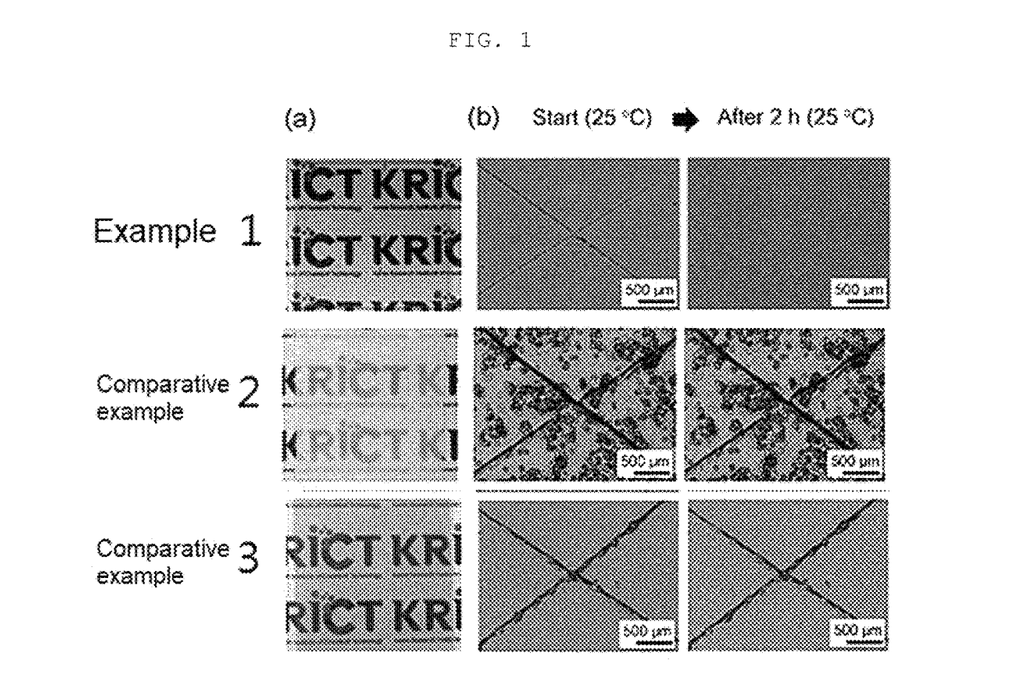
FIG. 1 shows (a) photographs of each film of Example 1, Comparative Example 2 and Comparative Example 3, and (b) optical microscope photographs for measurement of the self-restoring rate (%) at room temperature, showing states immediately after being scratched and states being left to stand at a temperature of 25° C. for 2 hours.
Figure 2:
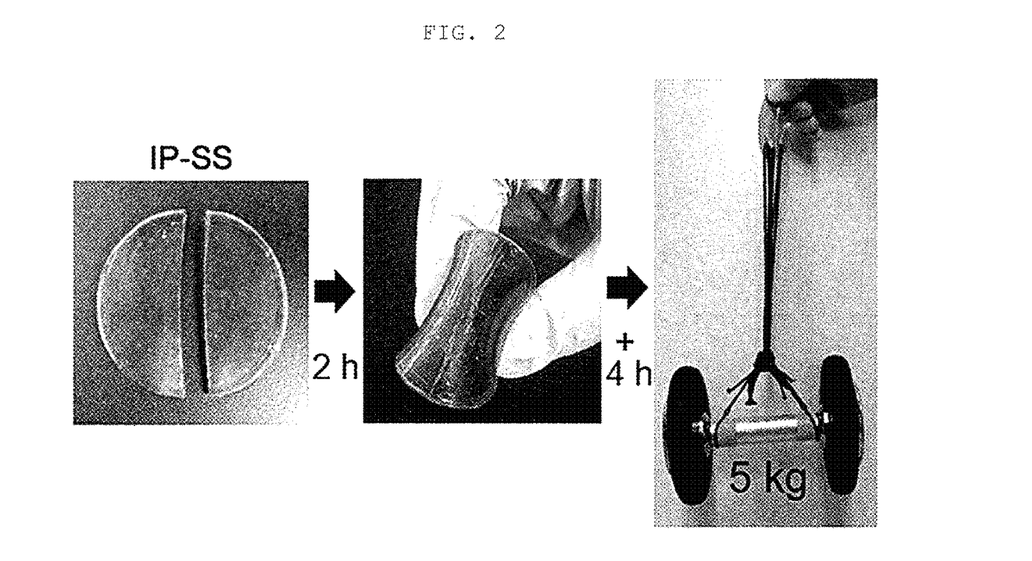
FIG. 2 shows photographs of a specimen of Example 1 being cut, being left to stand at a temperature of 25° C. for 2 hours and then being re-conjugated, and a photograph showing evaluation of the physical properties of the specimen being left to stand for 6 hours.
Figure 3:
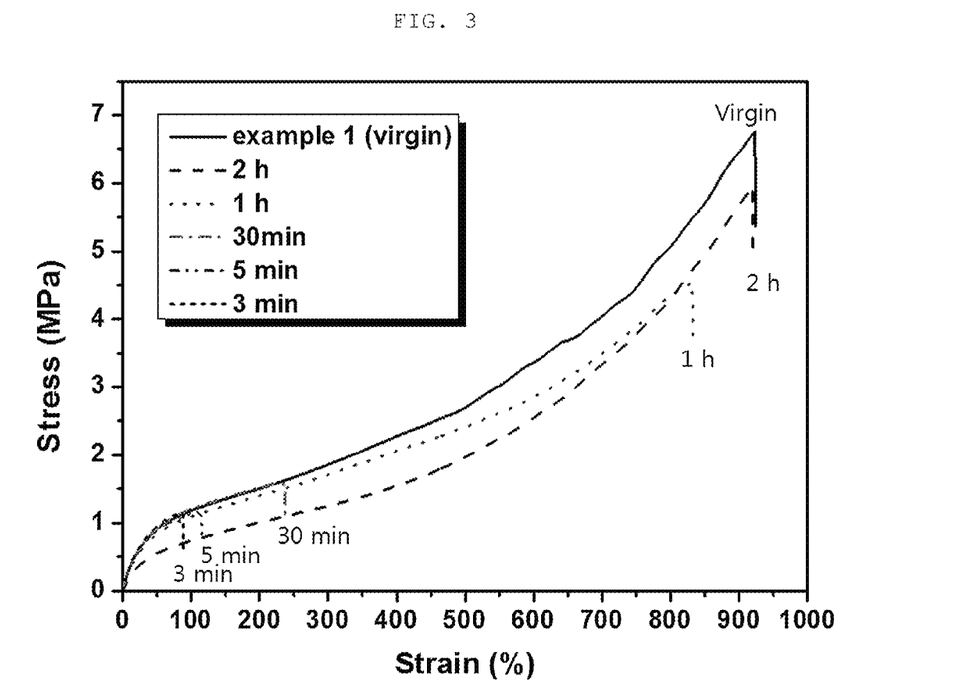
FIG. 3 shows a strain-stress curve for a toughness evaluation of the specimen of Example 1, in which a virgin shows a curve of the specimen immediately after manufacture and the time of 3 minutes, 5 minutes, 30 minutes, and 1 hour, and 2 hours shows a curve of the specimen obtained after re-conjugating the cut specimens for each time.

Hereinafter, a self-restoring polyurethane-based polymer and a preparation method therefor according to the present invention will be described in detail with reference to the accompanying drawings. The following drawings are provided by way of example so that those skilled in the art can fully understand the spirit of the present invention. Therefore, the present invention is not limited to the following drawings, but may be embodied in other forms, and the following drawings may be exaggerated in order to clarify the spirit of the present invention. Also, the same reference number throughout the specification represents the same elements.

Hereinafter, unless indicated otherwise, the technical and scientific terms used herein will be understood by those skilled in the art without departing from the scope of the present invention and descriptions of known functions and configurations that may unnecessarily obscure the scope of the present invention are omitted.

A self-restoring function of a self-restoring polyurethane-based coating film is classified as an extrinsic-type and an intrinsic-type.

In the case of the extrinsic-type, the damaged portion of a coating film is restored by a healing agent released while a microcapsule bursts, such that interfacial heterogeneity is shown at the restoring site or the re-restoration is fundamentally limited due to exhaustion of the microcapsule.

In order to solve this problem, there is proposed the intrinsic-type which introduces functional groups capable of reversibly covalent bonding to the chemical bond of the coating film itself by heat or light to thereby lower the interfacial heterogeneity and enable the re-restoration. However, there is a limitation that after the coating film is damaged, the damaged portion can be restored only when external stimuli such as heat treatment or light treatment are applied.

Thus, for a long time, the present applicant has conducted a study for a self-restoring polyurethane-based coating film having a high toughness and capable of self-restoring at room temperature without additional heat treatment or light-irradiation, upon the damage of the coating film, while maintaining high solvent resistance and transparency which are basic properties of the coating film.

In this process, it has been found that when an aromatic disulfide group (—Ar—S—S—Ar—) is introduced into a self-restored polyurethane-based coating film, it is possible to provide a polymer capable of self-restoring at room temperature without additional heat treatment or light-irradiation. In particular, it has been found that in a composition for preparing a polymer, a high toughness can be secured when the rate between the constituent components is adjusted to an appropriate range. Thereby, the present invention has been completed.

As described above, the self-restoring polyurethane-based polymer according to the present invention introduces an aromatic disulfide group (—Ar—S—S—Ar—) into its chemical structure to enable self-restoring at room temperature without additional heat treatment or light-irradiation. In this case, the room temperature may mean 10 to 45° C.

Specifically, the self-restoring polyurethane-based polymer according to one embodiment of the present invention may be a polymer obtained by polymerization of a composition containing an aromatic disulfide diol represented by Chemical Formula 1 below, an alicyclic polyisocyanate, and a polyol.

[Chemical Formula 1]

wherein $Ar_1$ and $Ar_2$ each are independently a substituted or unsubstituted arylene group having 6 to 30 carbon atoms.

The self-restoring polyurethane-based polymer according to the present invention may be self-restored at room temperature without additional heat treatment or light-irradiation by using the aromatic disulfide diol and the alicyclic polyisocyanate as a monomer component. As a specific example, the self-restoring polyurethane-based polymer according to one embodiment of the present invention may have a self-restoring rate of 50% or more at a temperature of 25° C.

In addition, the self-restoring polyurethane-based polymer according to one embodiment of the present invention may maintain a high toughness even after being re-conjugated after being cut. Specifically, for example, the self-restoring polyurethane-based polymer according to one embodiment of the present invention may satisfy a toughness restoring rate of Equation 2.

$$50 \le T_1/T_0 \times 100 \qquad \text{[Equation 2]}$$

wherein, $T_0$ is the pre-cut toughness (MJ/m³) of the self-restoring polyurethane-based polymer, and $T_1$ is the post-cut and re-conjugated toughness (MJ/m³) of the self-restoring polyurethane-based polymer after being left to stand a temperature of 25° C. for 2 hours.

On the other hand, when the aromatic disulfide diamine having an amine group at a terminal group is used instead of the aromatic disulfide diol, a self-restoring rate, a toughness, and a toughness restoring rate at room temperature may be significantly decreased as shown in Comparative Example 1 described later. Alternatively, when aliphatic polyisocyanate or aromatic polyisocyanate alone is used instead of alicyclic polyisocyanate, the self-restoring may not be obtained at room temperature, and also the toughness may not be restored at all, as shown in Comparative Examples 2 and 3 described later. That is, only when both the aromatic disulfide diol and the alicyclic polyisocyanate are used, an excellent self-restoring rate and a high toughness restoring rate at room temperature can be secured.

Meanwhile, in the aromatic disulfide diol represented by Chemical Formula 1 according to one example of the present invention, $Ar_1$ and $Ar_2$ each may be independently substituted or unsubstituted arylene groups having 6 to 18 carbon atoms, and more specifically, may be any one selected from a group consisting of a phenylene group, a biphenylene group, a naphthylene group, a terphenylene group, an anthrylene group, a phenanthrylene group, a phenalenylene group, a tetraphenylene group, a pyrenylene group, and the like, which are unsubstituted or substituted. Here, unless specified otherwise in the specification, "substitution or substituted" means that one or more hydrogen atom of the functional group of $Ar_1$ and/or $Ar_2$ is substituted with one or more substituent group selected from the group consisting of a halogen atom (—F, —Cl, —Br or —I), an alkyl group having 1 to 10 carbon atoms, an alkoxy group having 1 to 10 carbon atoms, a halogenated alkyl group having 1 to 10 carbon atoms, a cycloalkyl group having 3 to 30 carbon atoms, a hydroxyl group, an amine group, a carboxylic acid group and an aldehyde group, provided that the number of carbon atoms in the arylene group of 6 to 30 carbon atoms, represented by Chemical Formula 1 does not include the number of carbon atoms in the substituent group.

As described above, as the polyurethane-based polymer is prepared by using an aromatic disulfide diol having an terminal group of —OH, a polymer capable of having a high transparency as well as securing an improved self-restoring rate can be prepared and accordingly, more clear view can be secured.

In one example of the present invention, so far as the alicyclic polyisocyanate is an alicyclic compound having two or more isocyanate groups, the alicyclic polyisocyanate may be used without particular limitation. Specifically, for example, the alicyclic polyisocyanate may be any one or two or more selected from the group consisting of isophoronediisocyanate(IPDI), 4,4'-dicyclohexylmethane diisocyanate (hydrogenated MDI), cyclohexylenediisocyanate, methylcyclohexylenediisocyanate(hydrogenated TDI), bis(2-isocyanatoethyl)-4-dicyclohexene-1,2-dicarboxylate and 2,5-norbornanediisocyanate and 2,6-norbornanediisocyanate. Particularly, isophoronediisocyanate(IPDI) is preferably used in view of securing a high toughness.

Also, in one example of the present invention, it is preferable to appropriately adjust the content of the aromatic disulfide diol in the composition in order that the self-restoring polyurethane-based polymer has an excellent self-restoring rate and a high toughness. When the content of the aromatic disulfide diol is too low, the self-restoring rate and the toughness restoring rate at room temperature may be significantly decreased.

As a preferred example, the composition may contain an aromatic disulfide diol so as to satisfy Equation 1 below, and in this case, the upper limit of $M_{[disulfide]}/M_{[OH]}$ is not particularly limited, but may be 0.8, for example.

$$0.1 \leq M_{[disulfide]}/M_{[OH]} \quad \text{[Equation 1]}$$

wherein $M_{[disulfide]}$ is a total mole number of the aromatic disulfide diol in the composition, and $M_{[OH]}$ is a total mole number of the aromatic disulfide diol and the polyol in the composition.

That is, the aromatic disulfide diol is preferably added in an amount of 10 mol % or more of the total compound containing two or more hydroxy groups, and when the aromatic disulfide diol is added in an amount of 10 mol % or more, the self-restoring polyurethane-based polymer may have a self-restoring rate of 50% or more and a toughness restoring rate of 55% or more at a temperature of 25° C.

More preferably, $M_{[disulfide]}/M_{[OH]}$ may be 0.2 or more, and in this case, the self-restoring polyurethane-based polymer may have a self-restoring rate of 70% or more and a toughness restoring rate of 70% or more at a temperature of 25° C. More preferably, $M_{[disulfide]}/M_{[OH]}$ may be 0.3 or more, and in this case, the self-restoring polyurethane-based polymer may have a self-restoring rate of 95% or more and a toughness restoring rate of 75% or more at a temperature of 25° C.

In addition, the composition according to an example of the present invention may further include any one or two or more selected from aliphatic polyisocyanates and aromatic polyisocyanates, in addition to alicyclic polyisocyanates, whereby the self-restoring polyurethane-based polymer may secure a more excellent toughness.

In this case, only when the content of the alicyclic polyisocyanate in the total polyisocyanate-based compound is added in an appropriate amount or more, the self-restoring polyurethane-based polymer can secure an excellent self-restoring rate and a toughness restoring rate at room temperature. When the content of the alicyclic polyisocyanate is too low, the self-restoring rate and the toughness restoring rate at room temperature may be significantly decreased.

In a preferable example, the composition may satisfy Equation 3 below.

$$0.15 \leq M_{[cycloaliphatic]}/M_{[NCO]} \leq 1 \quad \text{[Equation 3]}$$

wherein $M_{[cycloaliphatic]}$ is a total mole number of the alicyclic polyisocyanate in the composition, and $M_{[NCO]}$ is a total mole number of the polyisocyanate-based compound in the composition.

In this case, the polyisocyanate-based compound refers to all of alicyclic polyisocyanates, aliphatic polyisocyanates, and aromatic polyisocyanates.

That is, when the alicyclic polyisocyanate is added in an amount of 15 mol % or more of the total mole number of the polyisocyanate-based compound, the self-restoring polyurethane-based polymer may have a self-restoring rate of 70% or more and a toughness restoring rate of 50% or more at a temperature of 25° C. More preferably, when the alicyclic polyisocyanate is added in an amount of 30 mol % or more of the total mole number of the polyisocyanate-based compound, the self-restoring polyurethane-based polymer may have a self-restoring rate of 90% or more and a toughness restoring rate of 60% or more at a temperature of 25° C.

Meanwhile, in one example of the present invention, the aliphatic polyisocyanate is not particularly limited as long as it is commonly used in the art. Specific examples thereof may be any one or two or more selected from the group consisting of ethylenediisocyanate, tetramethylenediisocyanate, hexamethylenediisocyanate (HDI), dodecamethylenediisocyanate, 1,6,11-undecanetriisocyanate, 2,2,4-trimethylhexamethylenediisocyanate, lysinediisocyanate, 2,6-diisocyanatomethylcaproate, bis(2-isocyanatoethyl)fumarate, bis(2-isocyanatoethyl)carbonate and 2-isocyanatoethyl-2,6-diisocyanatohexanoate, and the like.

The aromatic polyisocyanate is not particularly limited as long as it is commonly used in the art. Specific examples thereof may be any one or two or more selected from the group consisting of 1,3-phenylenediisocyanate, 1,4-phenylenediisocyanate, 2,4-tolylenediisocyanate (TDI), 2,6-tolylenediisocyanate, 4,4'-diphenylmethanediisocyanate (MDI), 2,4-diphenylmethanediisocyanate, 4,4'-diisocyanatobiphenyl, 3,3'-dimethyl-4,4'-diisocyanatobiphenyl, 3,3'-dimethyl-4,4'-diisocyanatodiphenylmethane, 1,5-naphthylenediisocyanate, 4,4'4"-triphenylmethanetriisocyanate, m-isocyanatophenylsulfonylisocyanate, p-isocyanatophenylsulfonylisocyanate, and the like.

In addition, the polyol according to one example of the present invention is not particularly limited as long as it is commonly used in the art. Specific examples thereof may be one or more high molecular weight polyols selected from the group consisting of polyetherpolyol, polycarbonatepolyol and polyesterpolyol.

The high molecular weight polyol may have a number average molecular weight of 500 to 20,000 g/mol, and more preferably, the high molecular weight polyol may be a compound having a number average molecular weight of 800 to 10,000 g/mol, and even more preferably, a number average molecular weight of 900 to 5,000 g/mol. As the soft segment properties of the self-restoring polyurethane-based polymer prepared in the above range are maximized to maximize softness and elasticity, the possibility of occurrence of defects such as cracks occurring in the curing process can be minimized and accordingly, the coating efficiency can be improved.

Also, it is preferable that the rate between the hydroxyl group-containing compound and the isocyanate group-containing compound is appropriately adjusted in order that the self-restoring polyurethane-based polymer can perform self-restoring at room temperature. Specifically, for example, the molar rate of an hydroxyl group of the hydroxyl group-containing compound to an isocyanate group of the isocyanate group-containing compound may be 1:0.8 to 1.2, and more preferably, 1:0.9 to 1.1. In the range above, the self-restoring polyurethane-based polymer may be effectively polymerized, and the self-restoring polyurethane-based polymer may secure excellent solvent resistance, abrasion resistance, and high transparency, which are the basic properties of the polymer, while performing self-restoring at room temperature upon the damage of the polymer.

In this case, the hydroxy group-containing compound may refer to all of an aromatic disulfide diol and a polyol containing two or more hydroxy groups, and the isocyanate group-containing compound may refer to all of alicyclic polyisocyanates, aliphatic polyisocyanates and aromatic polyisocyanates.

The present invention provides a self-restoring polyurethane-based coating film comprising the self-restoring polyurethane-based polymer as described above.

As described above, the self-restoring polyurethane-based polymer according to the present invention contains an aromatic disulfide group ($—Ar_1—S—S—Ar_2—$) and may be subject to disulfide metathesis of the disulfide group without additional heat treatment or light-irradiation at room temperature to render self-restoration possible.

Particularly, it is preferable to adjust the content of each compound to an appropriate range in order to secure excellent solvent resistance, abrasion resistance, and high transparency, with which the coating film should basically have, while being capable of self-restoring at room temperature, and the same descriptions as mentioned previously will be omitted.

As described above, the self-restoring polyurethane-based coating film comprising the self-restoring polyurethane-based polymer according to the present invention may have a self-restoring rate of 50% or more and a toughness restoring rate of 50% or more, and more preferably, the coating film may have a self-restoring rate of 80% to 100% and a toughness restoring rate or 70% to 90%. In this case, the self-restoring rate is a percentage value obtained by damaging the coating film with a scratch of a width of 30 to 70 μm, exposing the coating film to a temperature of 25° C. for 2 hours, and observing the restored width using an optical microscope, and the toughness restoring rate is a percentage obtained by measuring each toughness before cutting and after re-conjugating and then calculating the fraction of the toughness before cutting and after re-conjugating.

The present invention also provides a preparation method for a self-restoring polyurethane-based polymer from a self-restoring polyurethane-based precursor composition.

Specifically, a preparation method for a self-restoring polyurethane-based polymer according to one embodiment of the present invention may comprise polymerizing a composition containing an aromatic disulfide diol represented by the following Chemical Formula 1, an alicyclic polyisocyanate, and a polyol.

[Chemical Formula 1]

$HO—Ar_1—S—S—Ar_2—OH$ wherein $Ar_1$ and $Ar_2$ each are independently a substituted or unsubstituted arylene group having 6 to 30 carbon atoms.

In this case, the kind and content of each compound are the same as those described above, and thus the same descriptions as mentioned previously will be omitted.

In one embodiment of the present invention, the composition may further include an organic solvent to dissolve the compound to be added and mix it more uniformly.

The organic solvent is not particularly limited as long as it is commonly used in the art. Specific examples thereof may include alcohol-based solvents such as methanol, ethanol, methoxyethanol, propanol, isopropanol, butanol and isobutanol; acid solvents such as acetic acid and formic acid; nitro-based solvents such as nitromethane; ketone-based solvents such as acetone, methyl ethyl ketone and methyl isobutyl ketone; ester-based solvents such as ethyl acetate, butyl acetate and 3-methoxy-3-methylbutyl acetate; amine-based solvents such as dimethylformamide, methylpyrrolidone and dimethylacetamide; ether-based solvents such as tetrahydrofuran, 2-methyltetrahydrofuran, dimethyl ether and dibutyl ether; or the like, but is not limited thereto.

The amount of the solvent to be added is not particularly limited but may be added in such an amount that the compound to be added is sufficiently dissolved and uniformly mixed and easily applied for forming a coating film. Specifically, for example, 1 to 2000 ml of the organic solvent may be added per 1 mole of the aromatic disulfide diol, and more preferably, 100 to 1500 ml of the organic solvent may be added.

When each compound is uniformly mixed, the composition may be polymerized to prepare a self-restoring polyurethane-based polymer. Polymerization conditions are not particularly limited as long as the self-restoring polyurethane-based polymer is polymerized, and specifically, for example, the polymerization reaction may be carried out at a temperature of 20 to 200° C. for 30 minutes to 24 hours, but is not limited thereto.

Hereinafter, a self-restoring polyurethane-based polymer and a preparation method therefor according to the present invention will be described in more detail with reference to the examples. It should be understood, however, that the examples below are only provided to specifically describe the invention and do not limit the present invention and may be implemented in several forms. Unless otherwise defined, all technical and scientific terms have the same meaning as commonly understood by one of ordinary skill in the art to which the present invention belongs. The terminology used herein is for the purpose of describing particular examples only and is not intended to limit the present invention. Also, the singular forms as used in the specification and the appended claims are intended to include the plural forms as well, unless the context clearly indicates otherwise. In addition, the unit of the additives not specifically described in the specification may be % by weight.

Example 1

Polytetramethylene ether glycol (PTMEG, 14.5 mmol, 14.5 g, number average molecular weight 1,000 g/mol, manufactured by PTG Korea) was added to a 0.5 L three-necked flask equipped with a mechanical stirrer and a thermometer, followed by vacuum drying at 100° C. to remove moisture. Then, 5 ml of dimethylacetamide (DMAc) in which isophoronediisocyanate (IPDI, 30.45 mmol, 6.77 g) and dibutyltindilaurate (DBTDL, 50 mg) were dissolved was slowly added dropwise at 70° C. and the mixture was stirred for 2 hours.

Next, after cooling to room temperature (about 25° C.) 10 ml of DMAc in which bis (4-hydroxyphenyl) disulfide (HDS, 14.5 mmol, 3.63 g) was dissolved was added dropwise and the mixture was stirred at 40° C. for 1.5 hours.

Example 2

All processes were carried out in the same manner as described in Example 1, except that the added amount of PTMEG was changed to 16.5 g (16.5 mmol) and the added amount of HDS was changed to 3.13 g (12.5 mmol).

Example 3

All processes were carried out in the same manner as described in Example 1, except that the added amount of PTMEG was changed to 18.5 g (18.5 mmol) and the added amount of HDS was changed to 2.63 g (10.5 mmol).

Example 4

All processes were carried out in the same manner as described in Example 1, except that the added amount of PTMEG was changed to 20.5 g (20.5 mmol) and the added amount of HDS was changed to 2.13 g (8.5 mmol).

Example 5

All processes were carried out in the same manner as described in Example 1, except that the added amount of PTMEG was changed to 22.5 g (22.5 mmol) and the added amount of HDS was changed to 1.63 g (6.5 mmol).

Example 6

All processes were carried out in the same manner as described in Example 1, except that the added amount of PTMEG was changed to 24.5 g (24.5 mmol) and the added amount of HDS was changed to 1.13 g (4.5 mmol).

Example 7

All processes were carried out in the same manner as described in Example 1, except that a mixture of IPDI (20.45 mmol, 4.55 g) and hexamethylene diisocyanate (HDI, 10.00 mmol, 1.68 g) was added in place of IPDI (30.45 mmol, 6.77 g) in Example 1.

Example 8

All processes were carried out in the same manner as described in Example 1, except that a mixture of IPDI (10.45 mmol, 2.32 g) and HDI (20.00 mmol, 3.36 g) was added in place of IPDI (30.45 mmol, 6.77 g) in Example 1.

Example 9

All processes were carried out in the same manner as described in Example 1, except that a mixture of IPDI (5.45 mmol, 1.21 g) and HDI (25.00 mmol, 4.21 g) was added in place of IPDI (30.45 mmol, 6.77 g) in Example 1.

Comparative Example 1

All processes were carried out in the same manner as described in Example 1, except that bis(4-aminophenyl) disulfide (ADS, 14.5 mmol, 3.60 g) was added in place of HDS (14.5 mmol, 3.63 g) in Example 1.

Comparative Example 2

All processes were carried out in the same manner as described in Example 1, except that HDI (30.45 mmol, 5.12 g) was added in place of IPDI (30.45 mmol, 6.77 g) in Example 1.

Comparative Example 3

All processes were carried out in the same manner as described in Example 1, except that bis(4-isocyanatophenyl) methane (MDI, 30.45 mmol, 7.62 g) was added in place of IPDI (30.45 mmol, 6.77 g) in Example 1.

Comparative Example 4

All processes were carried out in the same manner as described in Example 1, except that 2-hydroxyethyldisulfide (HEDS, 14.5 mmol, 2.24 g) was added in place of HDS (14.5 mmol, 3.63 g) in Example 1.

TABLE 1

| | Diol (mole number) | | Diisocyanate (mole number) | | |
|---|---|---|---|---|---|
| | A | B | C | D | E |
| Example 1 | HDS (14.5) | PTMEG (14.5) | IPDI (30.45) | — | — |
| Example 2 | HDS (12.5) | PTMEG (16.5) | | — | — |
| Example 3 | HDS (10.5) | PTMEG (18.5) | | — | — |
| Example 4 | HDS (8.5) | PTMEG (20.5) | | — | — |
| Example 5 | HDS (6.5) | PTMEG (22.5) | | — | — |
| Example 6 | HDS (4.5) | PTMEG (24.5) | | — | — |
| Example 7 | HDS (14.5) | PTMEG (14.5) | IPDI (20.45) | HDI (10.00) | — |
| Example 8 | | | IPDI (10.45) | HDI (20.00) | — |
| Example 9 | | | IPDI (5.45) | HDI (25.00) | — |
| Comparative Example 1 | ADS (14.5) | PTMEG (14.5) | IPDI (30.45) | — | — |
| Comparative Example 2 | HDS (14.5) | PTMEG (14.5) | — | HDI (30.45) | — |
| Comparative Example 3 | HDS (14.5) | PTMEG (14.5) | — | — | MDI (30.45) |
| Comparative Example 4 | HEDS (14.5) | PTMEG (14.5) | IPDI (30.45) | — | — |

(A: Disulfide-based compound B: Polyol C: Alicyclic diisocyanate D: Aliphatic diisocyanate E: Aromatic diisocyanate)

[Evaluation of Physical Properties]

The physical properties of the polymers prepared from Examples 1 to 9 and Comparative Examples 1 to 4 were measured by the following methods, and the results are shown in Table 2 below.

1) Self-restoring rate (%): A percentage value obtained by subjecting the film-shaped polymer to scratch damage with a width of 30 to 70 μm, exposing the polymer at a temperature of 25° C. for 2 hours, and then observing the restored width thereof using an optical microscope.

2) Toughness (MJ/m³): In order to prepare specimens for measurement of tensile properties, the polymers prepared in Examples 1 to 9 and Comparative Examples 1 to 4 were diluted to 30% by weight in dimethylacetamide (DMAc) solvent, and then were applied using glass plates as a support at a constant speed using an applicator, and the applied solution was subjected to a primary drying by being stepwise heated in a convection oven, and then was further subjected to a vacuum drying at 80° C. for 12 hours. The dried film was prepared as a dog bone type specimen with a size of 25.5 mm in length, 3.11 mm in width, and 3.1 mm in thickness using a dumbbell cutter (Labfactory). Intstron 5943 (UK) equipment was used for a measurement in accordance with ASTM D638-03 standards and methods. An average value measured five times per sample was taken with a load cell of 10 KN, a crosshead speed of 10 mm/min and at 25° C. The toughness was converted into MJ/m³ by the integral of the strain-stress curve up to the cut strain.

3) Toughness restoring rate (%): The cutting experiment is a process of cutting the center of a specimen prepared in accordance with ASTM D638-03 standard. The re-conjugated experiment was conducted by tweezing both sides of the cut fracture with the pincette and being left to stand at 25° C. for 2 hours. In the toughness obtained by re-conjugation, the strain-stress curves of the specimens subjecting to the cutting and re-conjugating experiments were measured, and then the integral up to the cut strain was converted into MJ/m³.

In addition, the toughness restoring rate was calculated by the following Equation.

$$\text{Toughness restoring rate} = T_1/T_0 \times 100$$

wherein $T_0$ is the pre-cut toughness (MJ/m³) of the specimen, and $T_1$ is the toughness (MJ/m³) obtained after cutting and re-conjugating the specimen at a temperature of 25° C. for 2 hours.

TABLE 2

| | Self-restoring rate (%) | $T_0$ (MJ/m³) | $T_1$ (MJ/m³) | Toughness restoring rate (%) |
|---|---|---|---|---|
| Example 1 | 100 | 27 | 21 | 77.8 |
| Example 2 | 100 | 26 | 20 | 76.9 |
| Example 3 | 95 | 24 | 18 | 75.0 |
| Example 4 | 90 | 23 | 17 | 73.9 |
| Example 5 | 80 | 22 | 16 | 72.7 |
| Example 6 | 60 | 20 | 11 | 55.0 |
| Example 7 | 95 | 30 | 22 | 73.3 |
| Example 8 | 90 | 32 | 20 | 62.5 |
| Example 9 | 70 | 35 | 18 | 51.4 |
| Comparative Example 1 | 40 | 10 | 3 | 30.0 |
| Comparative Example 2 | 0 | 43 | 0 | 0 |
| Comparative Example 3 | 0 | 138 | 0 | 0 |
| Comparative Example 4 | 0 | 17 | 0 | 0 |

As shown in Table 2, in the polyurethane-based polymer containing bis (4-hydroxyphenyl) disulfide (HDS) as a monomer, the self-restoring rate was of 70% or more at 25° C., the toughness was 20 MJ/m³ or more, and the toughness restoring rate was 50% or more.

On the other hand, in the case of Comparative Example 1, as bis (4-aminophenyl) disulfide (ADS) in place of bis (4-hydroxyphenyl) disulfide (HDS) was used, the self-restoring rate and the toughness restoring rate were measured as 40% and 30%, respectively, of which characteristics were low. It is understood that the urea bond decreases the efficiency of metathesis of the aromatic disulfide rather than the urethane bond, resulting in a decrease in the self-restoring rate.

Also, when the diisocyanate was aliphatic or aromatic, in place of alicyclic, the self-restoring was not performed at all, and the polymer was not bonded at all upon re-conjugation after being cut such that the toughness after re-conjugating could not be measured.

In addition, even in the case of Comparative Example 4 in which 2-hydroxyethyl disulfide (HEDS), which is an aliphatic disulfide diol, is used, the self-restoring was not performed at all at room temperature, and the polymer was not bonded at all upon re-conjugation after being cut such that the toughness after re-conjugating could not be measured.

Although preferred exemplary embodiments of the present invention have been described above, various modifications and equivalents of the present invention are possible, and the exemplary embodiments above may be appropriately modified and similarly applied. Therefore, the above descriptions do not limit the scope of the present invention as defined by the limitations of claims below.

The invention claimed is:

1. A self-restoring polyurethane-based polymer obtained by polymerization of a composition containing an aromatic disulfide diol represented by Chemical Formula 1 below and comprising bis (4-hydroxyphenyl) disulfide, an alicyclic polyisocyanate comprising isophorone diisocyanate (IPDI), and a polyol, wherein the self-restoring polyurethane-based polymer has a self-restoring polyurethane rate of 50% or more at a temperature of 25° C., $$HO-Ar_1-S-S-Ar_2-OH \quad \text{[Chemical Formula 1]}$$

wherein $Ar_1$ and $Ar_2$ each are independently a substituted or unsubstituted arylene group having 6 to 30 carbon atoms.

2. The self-restoring polyurethane-based polymer of claim 1, wherein the alicyclic polyisocyanate further comprises any one or two or more selected from the group consisting of 4,4'-dicyclohexylmethanediisocyanate, cyclohexylenediisocyanate, methylcyclohexylenediisocyanate, bis(2-isocyanatoethyl)-4-dicyclohexene-1,2-dicarboxylate and 2,5-norbornanediisocyanate and 2,6-norbornanediisocyanate.

3. The self-restoring polyurethane-based polymer of claim 1, wherein the composition satisfies Equation 1 below, $$0.1 \leq M_{[disulfide]}/M_{[OH]} \quad \text{[Equation 1]}$$

wherein $M_{[disulfide]}$ is a total mole number of the aromatic disulfide diol in the composition, and $M_{[OH]}$ is a total mole number of the aromatic disulfide diol and the polyol in the composition.

4. The self-restoring polyurethane-based polymer of claim 1, wherein the self-restoring polyurethane-based polymer satisfies a toughness restoring rate of Equation 2 below, $$50 \leq T_1/T_0 \times 100 \quad \text{[Equation 2]}$$

wherein, $T_0$ is a toughness (MJ/m$^3$) of the self-restoring polyurethane-based polymer before cutting, and $T_1$ is a toughness (MJ/m$^3$) of the self-restoring polyurethane-based polymer obtained after cutting and re-conjugating at 25° C. for 2 hours.

5. The self-restoring polyurethane-based polymer of claim 1, wherein the composition further comprises any one or two or more selected from aliphatic polyisocyanates and aromatic polyisocyanates.

6. The self-restoring polyurethane-based polymer of claim 5, wherein the composition satisfies Equation 3 below, $$0.15 \leq M_{[cycloaliphatic]}/M_{[NCO]} \leq 1 \quad \text{[Equation 3]}$$

wherein $M_{[cycloaliphatic]}$ is a total mole number of the alicyclic polyisocyanate in the composition, and $M_{[NCO]}$ is a total mole number of the polyisocyanate-based compound in the composition.

7. A preparation method for a self-restoring polyurethane-based polymer, comprising polymerizing a composition containing an aromatic disulfide diol represented by Chemical Formula 1 below and comprising bis (4-hydroxyphenyl) disulfine, an alicyclic polyisocyanate comprising isophorone diisoyanate (IPDI), and a polyol, wherein the self-restoring polyurethane-based polymer has a self-restoring polyurethane rate of 50% or more at a temperature of 25° C., $$HO-Ar_1-S-S-Ar_2-OH \quad \text{[Chemical Formula 1]}$$

wherein $Ar_1$ and $Ar_2$ each are independently a substituted or unsubstituted arylene group having 6 to 30 carbon atoms.

8. A self-restoring polyurethane-based coating film comprising the self-restoring polyurethane-based polymer of claim 1.

9. The self-restoring polyurethane-based polymer of claim 1, wherein the composition further comprises dibutyltin dilaurate.

10. The preparation method of claim 7, wherein the composition further comprises dibutyltin dilaurate.

\* \* \* \* \*